(12) United States Patent
Schwederski

(10) Patent No.: US 6,502,720 B2
(45) Date of Patent: Jan. 7, 2003

(54) GOPHER PROBE

(76) Inventor: Horst Schwederski, 179 Niblick Rd., Paso Robles, CA (US) 93446

( * ) Notice: Subject to any disclaimer, the term of this patent is extended or adjusted under 35 U.S.C. 154(b) by 69 days.

(21) Appl. No.: 09/853,393

(22) Filed: May 10, 2001

(65) Prior Publication Data

US 2002/0166867 A1 Nov. 14, 2002

(51) Int. Cl.$^7$ .............................................. B65G 59/00
(52) U.S. Cl. ........................................ 221/268; 111/96
(58) Field of Search ..................... 221/30, 186, 247, 221/266, 268, 271; 111/96, 7.2; 222/191, 83.5

(56) References Cited

U.S. PATENT DOCUMENTS

| | | |
|---|---|---|
| 1,890,391 A | 12/1932 | Lane |
| 3,771,474 A | 11/1973 | Elston |
| 3,815,526 A | 6/1974 | Christopherson |
| 4,246,854 A | 1/1981 | Lempa |
| 4,413,440 A | 11/1983 | Schultz |
| 4,614,160 A | 9/1986 | Curlett |
| 5,170,729 A | * 12/1992 | Benner ........................ 111/7.2 |

* cited by examiner

Primary Examiner—Kenneth W. Noland
(74) Attorney, Agent, or Firm—James M. Duncan

(57) ABSTRACT

An apparatus for probing rodent burrows and dispensing a measured amount of rodent bait into the burrow. The disclosed apparatus comprises an elongated four-sided hollow shaft with a bait tank sealingly connected to the hollow shaft. The hollow shaft has a shaft tip which is also four-sided. One side of the shaft tip, the sealing end, slides with respect to the other three sides to open or close the shaft tip. The sealing end is at one end of a pusher bar. The other end of the pusher bar is connected to a thumb plate, so the operator may open or close the shaft tip using the thumb plate. A measure dose of bait is placed at the probe tip for dispensing by raising and lowering the probe tip, which causes bait to flow through either a calibrated orifice or a divider within the bait tank and enter into the four-sided hollow shaft.

18 Claims, 11 Drawing Sheets

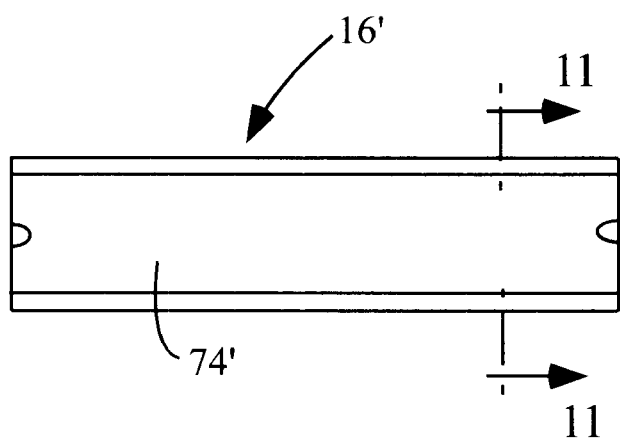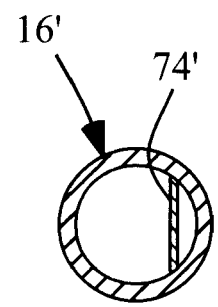
Fig. 10
Fig. 11

GOPHER PROBE

BACKGROUND OF THE INVENTION

The present invention is directed to devices that are used for rodent control, the rodents being gophers, moles or other burrowing types of animals. This invention is more particularly directed to an apparatus which dispenses a measured portion of poison directly into a gopher burrow or runway.

The need for probing devices which are able to deposit bait or poison into rodent burrows has long been recognized. The general goal of all of these devices is to locate and penetrate the gopher burrow with a minimal amount of disruption, deposit a load of bait, and remove the tool leaving the burrow intact. The deposited bait should, at least by appearance, present an appetizing treat for the unsuspecting gophers, such that the grain has not been broken into a powder or mixed with dirt. Because a network of rodent burrows can be quite extensive, with a large number of rodents, it is desirable for the application device to store multiple doses of bait, which may be individually dispensed in a single measured dose.

A problem encountered by these devices is that because the bait is dispensed through openings in a hollow probe, the openings can become plugged with dirt. As the probe is used to locate and penetrate gopher burrows, the probe tip is repeatedly pushed through the ground, leaving dirt deposited in any openings in the probe. The known devices have attempted to solve this problem through a number of different mechanisms. For example, U.S. Pat. No. 1,890,391, issued in 1932, employs a port located near the tip of the probe which opens by rotating the device. U.S. Pat. No. 3,771,474 discloses a device which uses a plunger with a plug for blocking the discharge of poison from the barrel of the device until the plunger is retracted. When the plunger is raised, the poison is discharged through the tip of the probe. The device disclosed in U.S. Pat. No. 4,413,440 attempts to solve the plugging problem by dispensing the poison through a lateral outlet opening immediately above the lower terminal end of the tube. Poison is released through the lateral outlet by actuating a rotary valve. The device disclosed in U.S. Pat. No. 4,614,160 dispenses poison through the tip, which is plugged with a penetrator during efforts to locate and penetrate the gopher burrow. The common feature of the cited devices and the other known probing and dispensing devices is that the probe portion of each device, from which the bait is dispensed, is round in shape. The round shape of the probe limits the means by which bait or other materials may be dispensed from a device.

Despite the efforts to solve the problem of dirt plugging in the probe, the known devices continue to have a variety of problems, including: (1) dirt plugging of the probe; (2) plugging of the probe with bait; (3) failure to dispense the proper dose of bait; (4) grinding the poison grain too finely or mixing the grain with dirt, resulting in an ineffective bait; or (5) being too complicated resulting in a high initial investment and/or high maintenance expenses and/or difficulties in cleaning and field stripping. A gopher probe is needed which does not have these problems.

SUMMARY OF THE INVENTION

The present invention is directed to a gopher probe which meets the need identified above.

The disclosed apparatus comprises an elongated four-sided hollow shaft. The hollow shaft has a handle end and a dispensing end. Three of the four sides of the hollow shaft taper at the dispensing end to form a shaft tip for penetrating and probing the ground surface. A pusher bar is slideably attached to one side of the hollow shaft, such that the pusher bar slides relative to the long axis of the shaft. The pusher bar has two ends, the operator end coinciding with the handle end of the hollow shaft, and the sealing end, coinciding with the dispensing end. The sealing end forms a closure at the shaft tip. At the operator end, the pusher bar may be connected to a thumb plate, which may be activated by the user's thumb or palm acting on a pushing surface.

Two of the four sides, the straight sides, are at facing opposite sides of the hollow shaft. At the shaft tip, each straight side has a "V-shaped" pointed end. The other two sides of the hollow shaft comprise, at facing opposite sides, the bait tank side and the pusher bar side. The bait tank side is so named because it is the side of the hollow shaft on which the bait tank is attached. The pusher bar side is so named because it is the side to which the pusher bar is slideably attached. The pusher bar side may have a groove adapted to receive groove guides attached to the pusher bar, which slideably attach the pusher bar to the pusher bar side. The bait tank side terminates at the shaft tip, the bait tank side having an angled-end which is complimentary to the adjacent angle of one leg of the "V" formed by each of the straight sides, the angled-end forming a seal on one side of the shaft tip. The pusher bar side terminates above the shaft tip. The fourth side of the shaft tip is formed by the sealing end of the pusher bar which extends below the pusher bar side.

The sealing end of the pusher bar is angled, with an angle complimentary to the adjacent angle of the leg of the "V" formed by the two straight sides, opposite the leg of the "V" sealed by the angled-end of the bait tank side. As the pusher bar slides with respect to the hollow shaft, the sealing end either seals the pusher bar side of the shaft tip in a first position, or unseals the pusher bar side of the shaft tip in a second position.

The handle end of the hollow shaft may have a tee-shaped handle to assist the user in probing efforts. A bait tank for storage of poison or other material to be dispensed attaches to the hollow shaft between the handle end and dispensing end, the bait tank having a lower end facing the shaft tip and an upper end facing the handle end. The bait tank has a sealable hole for loading the bait tank with the gopher bait or other material to be dispensed. In one embodiment, the bait tank has a calibrated orifice, located adjacent to the upper end, the calibrated orifice facing upwards toward the handle end. The calibrated orifice forms the entry into the measured dose reservoir. The measured dose reservoir connects to the shaft opening, allowing the contents of the measured dose reservoir to enter into the hollow shaft and fall through the hollow shaft to the shaft tip. A measured dose of gopher bait is placed at the shaft tip by first lifting the device so that bait within the bait tank is placed above the calibrated opening, then lowering the device, thereby filling the measured dose reservoir, the dose of bait thereafter falling to the shaft tip.

During probing efforts, the sealing end of the pusher bar is in the raised, or closed position so that the four tapered sides of the shaft tip are aligned forming a point. Once the gopher burrow is located and the probe in place, the sealing end is placed in the lowered position by pushing down on the thumb plate. Pushing down on the thumb plate causes the pusher bar and the sealing end to slide in a downward direction relative to the hollow shaft, so that the sealing end extends downward past the other sides of the tapered shaft tip thereby opening the shaft tip. The measured dose of bait within the hollow shaft falls through the opening into the gopher burrow. The sealing end is then closed by raising the pusher bar by pulling up on the thumb plate or allowing the pusher bar to rise to its normal biased position, and the shaft removed from the gopher burrow. Following this procedure, the tool may be used repeatedly until the bait tank is empty.

BRIEF DESCRIPTION OF THE DRAWINGS

FIG. 10 is a side view of the bait tank of the alternative embodiment, without the cap and lower end.

FIG. 11 is a view taken along section 11—11.

DETAILED DESCRIPTION OF THE EMBODIMENTS

Figure 1:
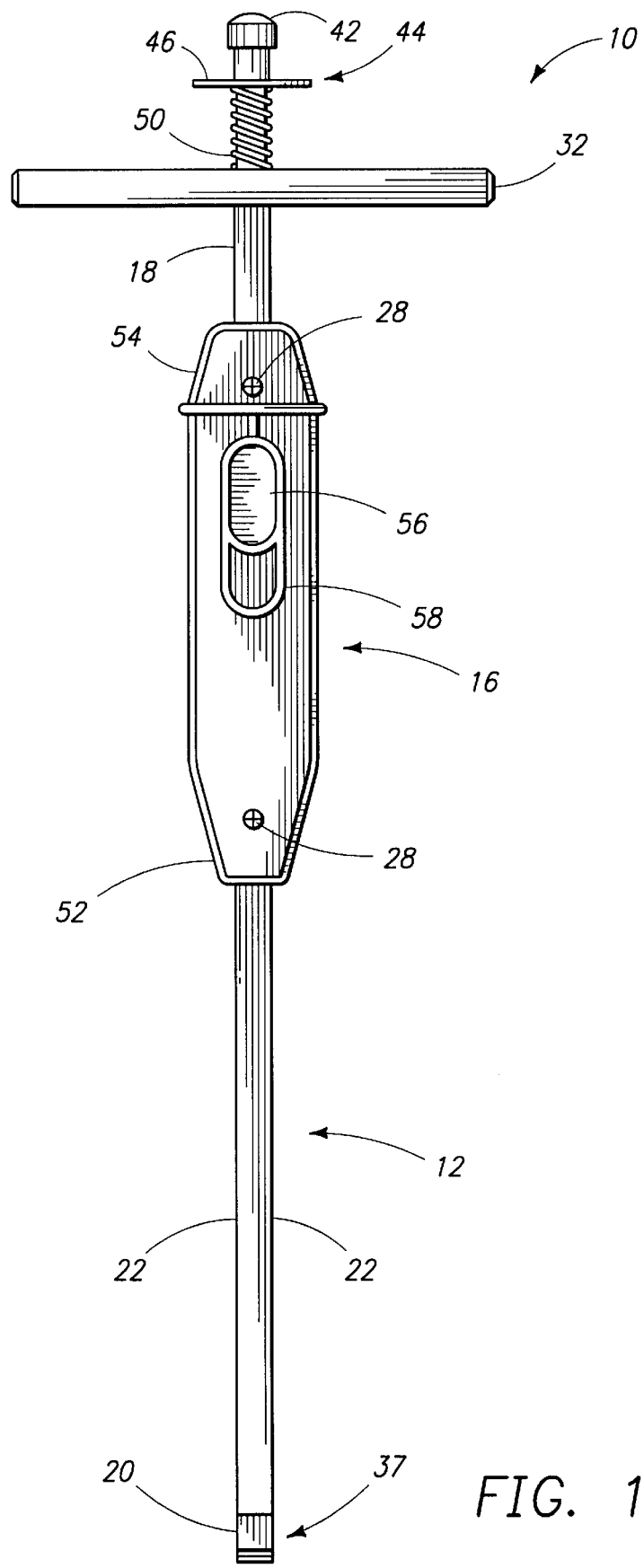
FIG. 1 is a front view of the disclosed invention.
Figure 2:
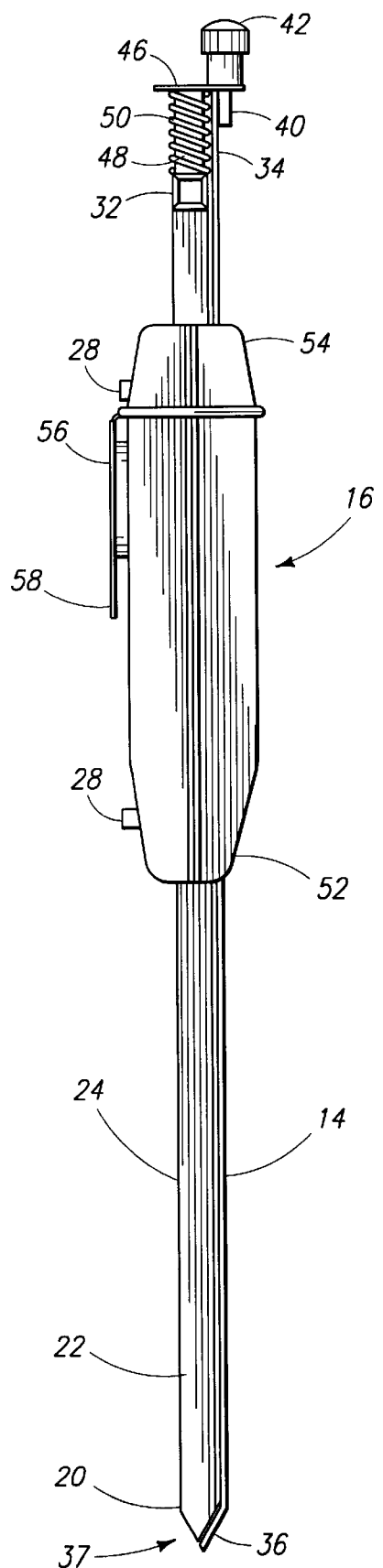
FIG. 2 is a side view of the disclosed invention.

Referring now specifically to the drawings, FIG. 1 shows the disclosed gopher probe 10. As shown in FIGS. 1 and 2, the basic components of the gopher probe 10 comprise the four-sided hollow shaft 12, the pusher bar 14 and the bait tank 16. The four-sided hollow shaft 12 may be constructed of any rectangular or square-shaped stock having sufficient strength and durability to be used in probing for gopher burrows. Acceptable materials include metals, composites and high impact plastics. As suggested by its name, the hollow shaft 12 is hollow inside to allow bait or other agricultural materials, such as fertilizer or plant nutrients, to pass through the hollow shaft 12.

The four-side hollow shaft 12 has a handle end 18 and a dispensing end 20. The hollow shaft 12 has four sides, namely the two straight sides 22, the bait tank side 24, and the pusher bar side 26, which is normally covered by the pusher bar 14. The two straight sides 22 are at facing opposite sides of the hollow shaft 12. As shown on FIG. 4, the pusher bar side 26 has a groove terminating at the dispensing end 20, the groove having an opening at the dispensing end 20. The bait tank side 24 may be tapped and threaded so as to accept screws 28 for securing the bait tank 16 to the hollow shaft 12. The hollow shaft 12 has an opening 30 on the bait tank side 24 for allowing material to pass from the bait tank 16 into the hollow interior of the hollow shaft 12. As depicted in FIG. 1, the handle end 18 may terminate in a "T" handle 32.

A pusher bar 14 is slideably attached to the hollow shaft 12. The pusher bar 14 has an operator end 34 and a sealing end 36. The pusher bar 14 has the same width as the pusher bar side 26.

Figure 6:
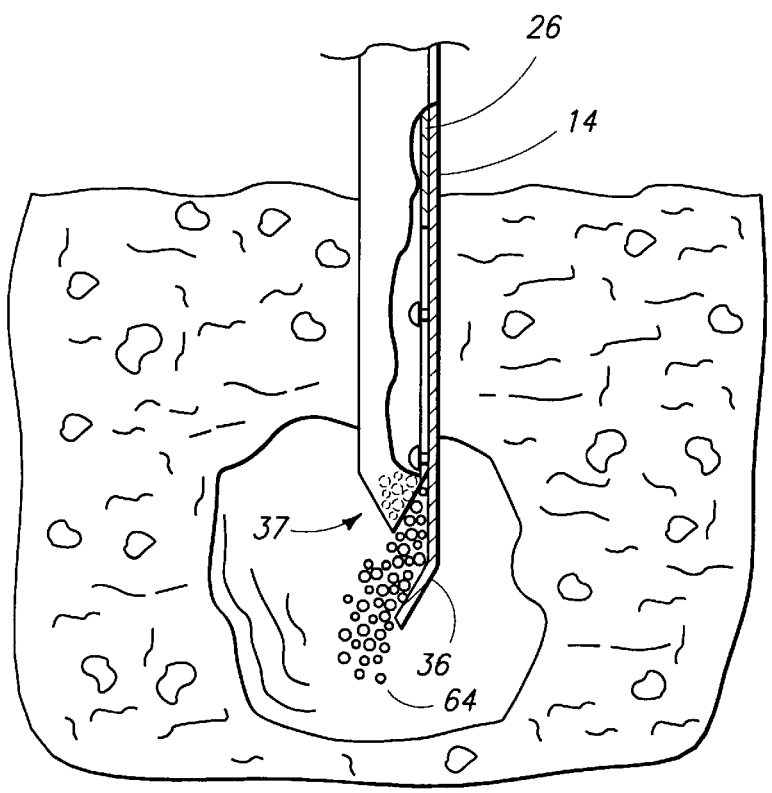
FIG. 6 shows the gopher probe in the open position, dispensing gopher bait inside a gopher burrow.
Figure 7:
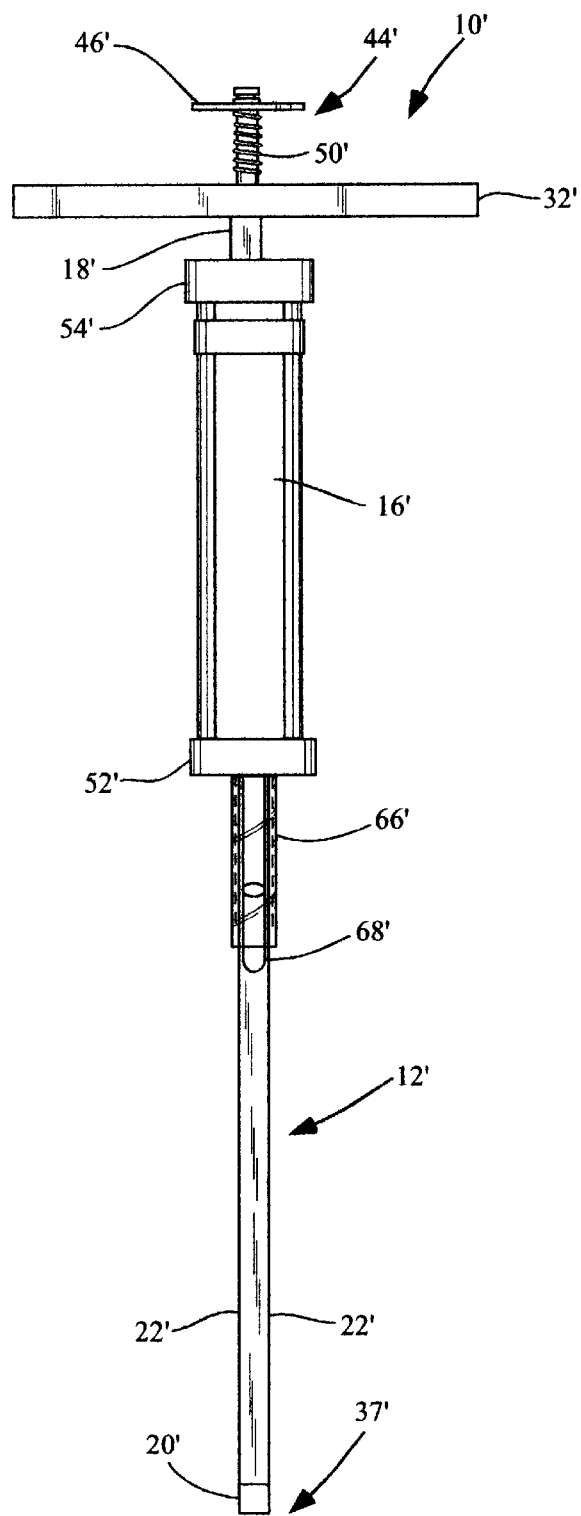
FIG. 7 is a front view of an alternative embodiment of the disclosed invention.
Figure 8:
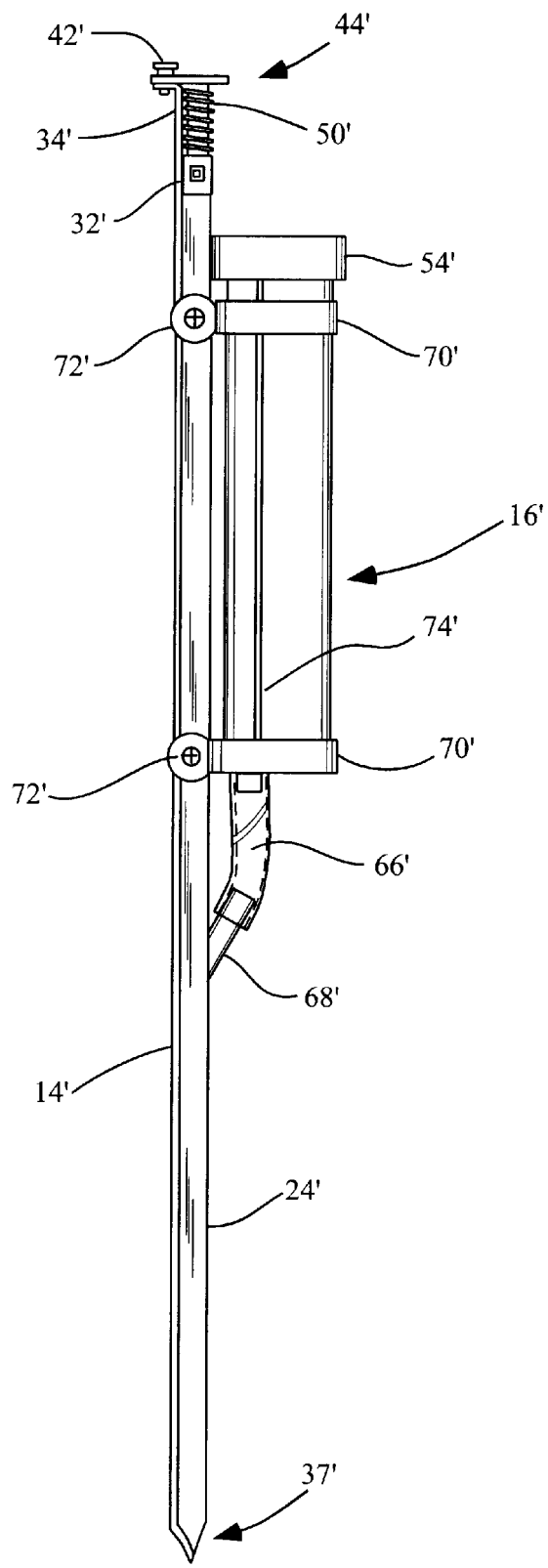
FIG. 8 is a side view of the alternative embodiment.
Figure 9:
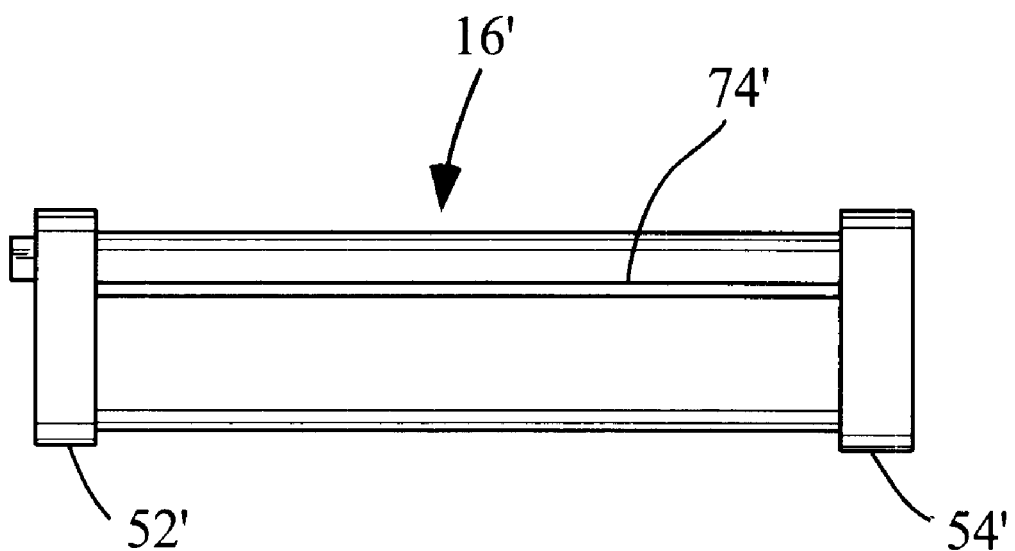
FIG. 9 is a side view of the bait tank of the alternative embodiment.

Three of the four sides of the hollow shaft 12, namely the two straight sides 22 and the bait tank side 24, are joined and taper at the shaft tip 37 so as to form a point for penetrating and probing the ground surface. The three sides may be joined by welding or other bonding means. The pusher bar side 26 terminates above the dispensing end 20 and does not form part of the shaft tip 37. At the shaft tip 37, each straight side 22 has a "V-shaped" pointed end. The bait tank side 24 terminates at the shaft tip 37 with an angled-end, the angle being complimentary to the adjacent angle formed by the pointed end of each straight side 22. The angled-end of the bait tank side 24 forms a seal on one side of the shaft tip 37 and is bonded to the edges of the pointed ends of the adjacent straight sides 22. The fourth side of the shaft tip 37 is formed by the sealing end 36 of the pusher bar 14. The sealing end 36 may form a leading surface when the shaft tip 37 is used to probe for gopher burrows, preventing any dirt from getting into the hollow shaft 12. In the closed position, the sealing end 36 of the pusher bar 14 seals the shaft tip 37. In the open position, as depicted in FIG. 6, the sealing end 36 extends beneath the other three sides of the shaft tip 37, thereby allowing the contents of the hollow shaft 12 to fall out through the shaft tip 37.

Figure 3:
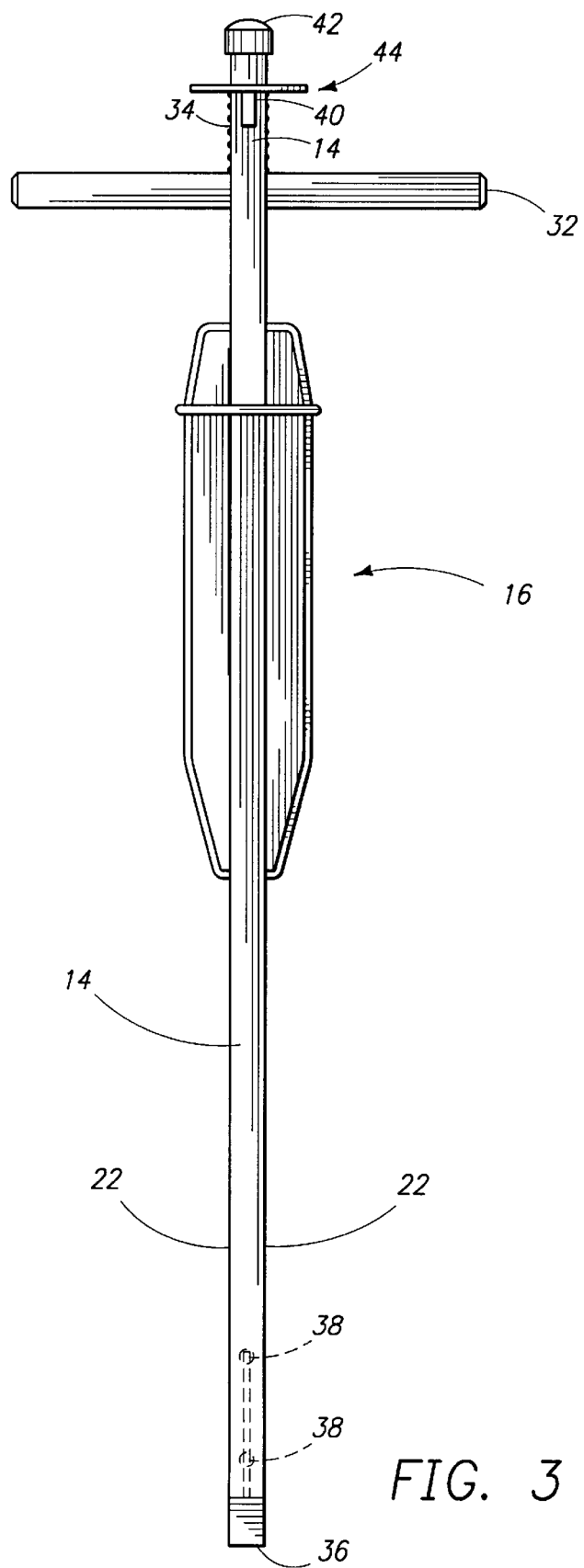
FIG. 3 is a rear view of the disclosed invention.
Figure 4:
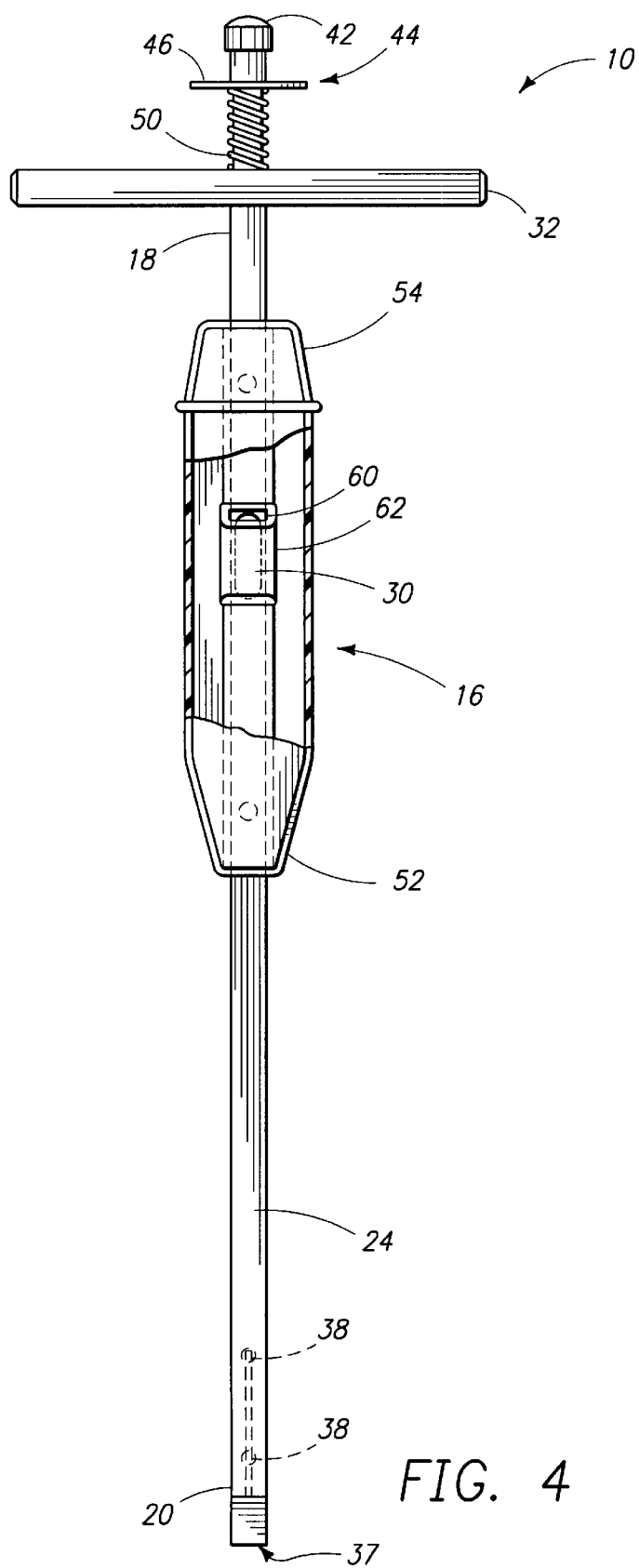
FIG. 4 shows a detailed view of the bait tank.

As shown on FIG. 4, the pusher bar 14 has groove guides 38 which insert into the groove on the pusher bar side 26 through the opening in the groove at the dispensing end 20 to slideably attach the pusher bar 14 to the hollow shaft 12. The groove guides 38 may be fabricated from screws, bolts, or other fasteners, which have a head larger than the width of the groove, but where the shaft of the groove guide fits through the groove opening at the dispensing end 20. The groove guides 38 may be tack welded to pusher bar 14 for additional strength. As shown on FIG. 3, the bait tank 16 is slotted to allow the shaft 12 and pusher bar 14 to fit within the slot and for the pusher bar 14 to freely slide through the slot.

The operator end 34 of the pusher bar 14 has a fastener receiver 40 or other fastening means for attaching the thumb plate 44 to the pusher bar 14. The fastener receiver 40 receives a fastener 42 which connects thumb plate 44 to the pusher bar 14. The thumb plate 44 comprises a pushing surface 46 and a plunger 48. The thumb plate 44 is located so that a user may wrap his or her fingers around the "T" handle 32, and be able to operate thumb plate 44 by pushing on the pushing surface 46 with the user's thumb or thumbs. A spring 50, or other biasing means, is attached to plunger 48 maintaining the sealing end 36 of the pusher bar 14 in the closed position, sealing the shaft tip 37 until the operator desires to release material from the hollow shaft 12 by pushing down on thumb plate 44. Handle 32 has a hole on the side facing the plunger 48, the hole sufficiently larger than the diameter of plunger 48 so that the plunger 48 may be inserted into handle 32 to guide thumb plate 44 as it is pushed downward.

Pushing down on thumb plate 44 causes pusher bar 14 to slide downward, toward the ground surface, thereby opening the seal of the shaft tip 37 formed by sealing end 36.

As depicted in FIGS. 1 through 4, the bait tank 16 of the disclosed embodiment is attached to the hollow shaft 12 such that the long axis of the bait tank 16 is aligned along the long axis of the hollow shaft 12. However, it will be appreciated that different shapes of bait tank may be used without impacting the performance of the gopher probe 10. The bait tank 16 should be constructed of a light material, such as plastic, which may be injection molded. The bait tank 16 has a lower end 52 facing the shaft tip 37 and an upper end 54 facing the handle end 18. The bait tank 16 has a hole 56 through which gopher bait or other materials may be placed inside the bait tank 16. A sealing plug 58 may be used to seal the hole 56 to retain the materials inside the bait tank 16. The bait tank 16 may be mounted to the bait tank side 24 of the hollow shaft 12. The bait tank side 24 may be tapped and threaded so as to accept screws 28 or other fasteners for securing the bait tank 16 to the hollow shaft 12.

The bait tank 16 has a calibrated orifice 60, located adjacent to the upper end, the calibrated orifice 60 facing upwards toward the handle end 18. The calibrated orifice 60 forms the entry into the measured dose reservoir 62. It has been found that the preferred dimensions of the calibrated orifice 60 are 7/16" by 5/8".

The measured dose reservoir 62 connects to the opening 30 of the bait tank side 24, providing a flow path from the bait tank 16 to the inside of the hollow shaft 12. The contents of the measured dose reservoir 62 to fall through the hollow shaft 12 to the shaft tip 37. A measured dose of gopher bait is placed at the shaft tip 37 by first raising shaft tip 37 higher than handle end 18, which causes a portion of the bait within the bait tank 16 to be placed above the calibrated orifice 60. Shaft tip 37 is then lowered, thereby causing the measured dose reservoir 62 to be filled with a dose of bait. The bait within the measured dose reservoir will thereafter fall to the shaft tip 37.

Figure 5:
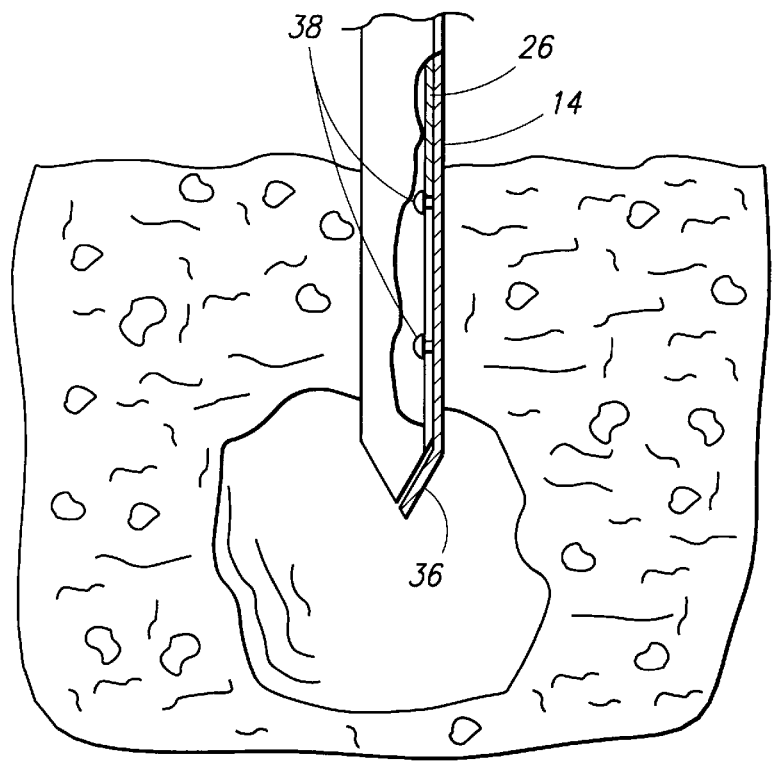
FIG. 5 shows the gopher probe in the closed position, penetrating a gopher burrow.

Once the bait is placed at the shaft tip 37, a suspected rodent burrow is probed with the hollow shaft 12, until the burrow is located. As depicted in FIGS. 5 and 6, once the shaft tip 37 is within the rodent run, the user pushes thumb plate 44 and the measured dose of bait 64 or other material will fall through the shaft tip 37. When thumb plate 44 is released, the spring 50 or other biasing means returns the thumb plate 44 and pusher bar 14 to the raised position, closing shaft tip 37. This procedure may be repeated as necessary, with a measured dose of material 64 being placed at the desired location by the described procedure and opening the device by pushing thumb plate 44.

An alternative embodiment of the apparatus is disclosed in FIGS. 7 through 15. In this embodiment, the bait tank 16' is attached to hollow shaft 12' with clamps 70'. Clamps 70' may be fashioned from "C-type" clamps, which are attached to the hollow shaft 12' with fasteners 72', such as bolts and nuts or rivets. Bait or other material, such as fertilizer, are inserted into bait tank 16' through the top of the open end of bait tank 16' when cap 54' is removed. Bait tank 16' has a divider 74' which separates the bait stored in bait tank 16' from the bait to be placed into the hollow shaft 12'. Bait tube 66' is connected on one end to the lower end of the bait tank 52' and connected on the other end to the connector 68' which provides an inlet to the inside of the hollow shaft 12'.

Figures 12, 13:
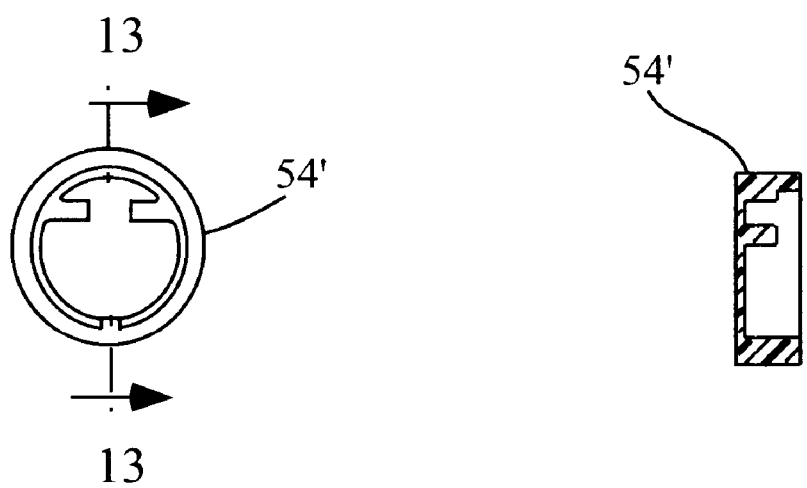
FIG. 12 is a top view of the cap of the alternative embodiment.
FIG. 13 is a view taken along section 13—13.
Figure 14:
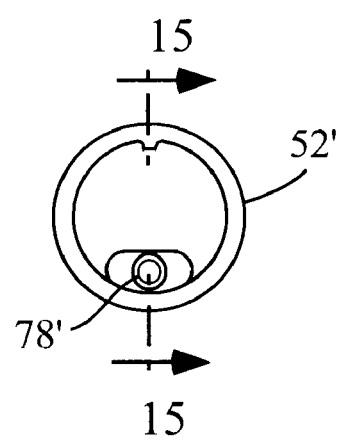
FIG. 14 is a top view of the tube bottom of the alternative embodiment.
Figure 15:
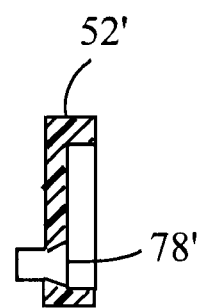
FIG. 15 is a view taken along section 15—15.

As shown in detail in FIGS. 12 and 13, the inside surface of cap 54' is configured so that if the shaft tip 37' is raised, bait will fall to the inside surface of cap 54' and thereby pass over divider 74'. This configuration allows bait stored in bait tank 16' to flow behind divider 74' and fall through bait tube 66', and enter the hollow shaft 12' through connector 68'. Use of this embodiment is similar to that of the other embodiment. A measured dose of gopher bait is placed at the shaft tip 37' by first lifting the gopher probe 10' with the shaft tip 37' higher than handle end 18' causing a certain amount of bait within the bait tank 16' to flow through the opening of cap 54', as shown in FIG. 13 and be placed above divider 74'. The shaft tip 37' is then lowered, allowing the measured dose of bait to flow through bait tube 66' and into the hollow shaft 12' through connector 68'. Upon pushing thumb plate 44', the measured dose of gopher bait 64, fertilizer, or other material will fall through the shaft tip 37'. When thumb plate 44' is released, the spring 50' or other biasing means returns the thumb plate 44' and pusher bar 14' to the raised position, closing shaft tip 37'. This procedure may be repeated as necessary, with a measured dose of material 64 being placed at the desired location by the described procedure and opening the device by pushing thumb plate 44'.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A rodent burrow probe and bait dispenser comprising:
    (a) an elongated hollow shaft having four sides, the shaft having a handle end, a dispensing end, an opening in one of the four sides and three of the four sides tapering together at the dispensing end;
    (b) a pusher bar having an operator end and a sealing end, the pusher bar slideably attached to the shaft so that the operator end coincides with the handle end and the sealing end coincides with the dispensing end;
    (c) a shaft tip comprising the three sides of the hollow shaft tapering together at the dispensing end and further comprising the sealing end, such that the shaft tip is sealed by sliding the pusher bar to a first position or unsealed by sliding the pusher bar to a second position; and
    (d) a bait tank attached to the shaft, the bait tank sealingly connected to the opening in one of the four sides to allow bait to pass from the bait tank to the hollow shaft.

2. The apparatus of claim 1 further comprising a thumb plate attached to the operator end of the pusher bar for sliding the pusher bar to the first position or the second position.

3. The apparatus of claim 2 further comprising biasing means connected to the thumb plate to bias the pusher bar in the first position.

4. The apparatus of claim 1 wherein the handle end has a tee-shaped handle.

5. The apparatus of claim 1 wherein the bait tank has a lower end facing the dispensing end and an upper end facing the handle end.

6. The apparatus of claim 5 wherein a calibrated orifice is inside the upper end of the bait tank, the calibrated orifice sealingly connected to the opening in one of the four sides to allow bait to pass through the calibrated orifice to the hollow shaft.

7. The apparatus of claim 1 wherein the four sides of the hollow shaft comprise two straight sides on facing opposite sides of the hollow shaft, a bait tank side upon which the bait tank is attached, and a pusher bar side upon which the pusher bar is slideably attached.

8. The apparatus of claim 7 wherein each of the two straight sides has a v-shaped pointed end at the shaft tip.

9. The apparatus of claim 8 wherein the bait tank side has an angled end at the shaft tip wherein the angle of the angled end is complimentary to the angle of one leg of the v-shaped pointed end of each of the adjacent straight sides.

10. The apparatus of claim 9 wherein the sealing end of the pusher bar has an angled end at the shaft tip wherein the angle of the angled end is complimentary to the angle of one leg of the v-shaped pointed end of each of the adjacent straight sides.

11. A rodent burrow probe and bait dispenser comprising:
(a) an elongated hollow shaft having four sides, the shaft having a handle end, a dispensing end, an opening in one of the four sides and three of the four sides tapering together at the dispensing end;
(b) a pusher bar having an operator end and a sealing end;
(c) a bait tank attached to the shaft, the bait tank having a lower end facing the dispensing end, an upper end facing the handle end;
(d) the hollow shaft comprising two straight sides on facing opposite sides of the hollow shaft, each straight side having a pointed end, a bait tank side upon which the bait tank is attached, the bait tank side having an angled end, and a pusher bar side having a groove;
(e) a calibrated orifice inside the bait tank, the calibrated orifice being adjacent to the upper end, the calibrated orifice sealingly connected to the opening in one of the four sides to allow bait to pass from the bait tank through the calibrated orifice to the hollow shaft;
(f) groove guides attached to the pusher bar for inserting into the groove of the pusher bar side so that the pusher bar is slideably attached to the pusher bar side so that the operator end is coincides with the handle end and the sealing end coincides with the dispensing end; and
(g) a shaft tip comprising the pointed ends of the two straight sides, the angled end of the bait tank side, and the sealing end of the pusher bar, such that the shaft tip is sealed by sliding the pusher bar to a first position or unsealed by sliding the pusher bar to a second position.

12. The apparatus of claim 11 further comprising a thumb plate attached to the operator end of the pusher bar for sliding the pusher bar to the first position or the second position.

13. The apparatus of claim 12 further comprising biasing means connected to the thumb plate to bias the pusher bar in the first position.

14. The apparatus of claim 11 wherein the handle end has a tee-shaped handle.

15. A rodent burrow probe and bait dispenser comprising:
(a) an elongated hollow shaft having four sides, the shaft having a handle end, a dispensing end, an opening in one of the four sides and three of the four sides tapering together at the dispensing end;
(b) a pusher bar having an operator end and a sealing end;
(c) a bait tank attached to the shaft, the bait tank comprising a lower end facing the dispensing end, an upper end facing the handle end, and a divider running from the lower end to the upper end;
(d) a bait tube having a first end and a second end, the first end connected to the lower end of the bait tank and the second end connected to the opening in one of the four sides so as to allow bait to pass from the bait tank to the hollow shaft;
(e) the hollow shaft comprising two straight sides on facing opposite sides of the hollow shaft, each straight side having a pointed end, a bait tank side upon which the bait tank is attached, the bait tank side having an angled end, and a pusher bar side having a groove;
(f) groove guides attached to the pusher bar for inserting into the groove of the pusher bar side so that the pusher bar is slideably attached to the pusher bar side so that the operator end coincides with the handle end and the sealing end coincides with the dispensing end; and
(g) a shaft tip comprising the pointed ends of the two straight sides, the angled end of the bait tank side, and the sealing end of the pusher bar, such that the shaft tip is sealed by sliding the pusher bar to a first position or unsealed by sliding the pusher bar to a second position.

16. The apparatus of claim 15 further comprising a thumb plate attached to the operator end of the pusher bar for sliding the pusher bar to the first position or the second position.

17. The apparatus of claim 15 further comprising biasing means connected to the thumb plate to bias the pusher bar in the first position.

18. The apparatus of claim 15 wherein the handle end has a tee-shaped handle.

* * * * *